United States Patent [19]
Flores

[11] Patent Number: 6,035,573
[45] Date of Patent: Mar. 14, 2000

[54] FISH STRIKE DETECTOR FOR FISHING ROD

[76] Inventor: Richard Flores, 1236 E. Saginaw, Fresno, Calif. 93704

[21] Appl. No.: 08/925,210

[22] Filed: Sep. 8, 1997

[51] Int. Cl.⁷ ..................................................... A01K 97/12
[52] U.S. Cl. ...................................................... 43/17; 43/25
[58] Field of Search ............................................ 43/17, 25

[56] References Cited

U.S. PATENT DOCUMENTS

| | | | |
|---|---|---|---|
| 2,302,337 | 11/1942 | Mantell | 43/17 |
| 2,634,538 | 4/1953 | Sader | 43/17 |
| 3,624,689 | 11/1971 | Rizzo | 43/17 |
| 3,696,546 | 10/1972 | Ambrose | 43/17 |
| 3,740,888 | 6/1973 | Young | 43/17 |
| 4,006,550 | 2/1977 | Rizzo | 43/17 |
| 4,020,578 | 5/1977 | Hope | 43/17 |
| 4,038,772 | 8/1977 | Milhaly | 43/17 |
| 4,178,712 | 12/1979 | Williams | 43/17 |
| 4,466,211 | 8/1984 | Mathauser | 43/17 |
| 4,519,158 | 5/1985 | Kirk | 43/17 |
| 4,541,195 | 9/1985 | Delaney | 43/17 |
| 4,586,284 | 5/1986 | Westwood | 43/17 |

*Primary Examiner*—Kurt Rowan
*Attorney, Agent, or Firm*—Richard A. Ryan

[57] ABSTRACT

A fish strike detector for use on flexible fishing rods to detect and notify the angler that a fish is striking the bait located at the end of his or her fishing line. Light from a light bulb partially enclosed in a housing body is activated when the fishing rod is flexed from fish striking at the bait. The housing body, removably attached to a rigid vertical member attached to the fishing rod, houses an electrical circuit and power supply. A portion of the electrical circuit extends outside the casing body. A rigid horizontal member is attached to the fishing rod on one side of the vertical member. When a fish strikes the bait, the flexible fishing rod bends downward, causing the contact member to apply pressure to the portion of the electrical circuit extending outside the housing and complete the electrical circuit to activate the light.

20 Claims, 4 Drawing Sheets

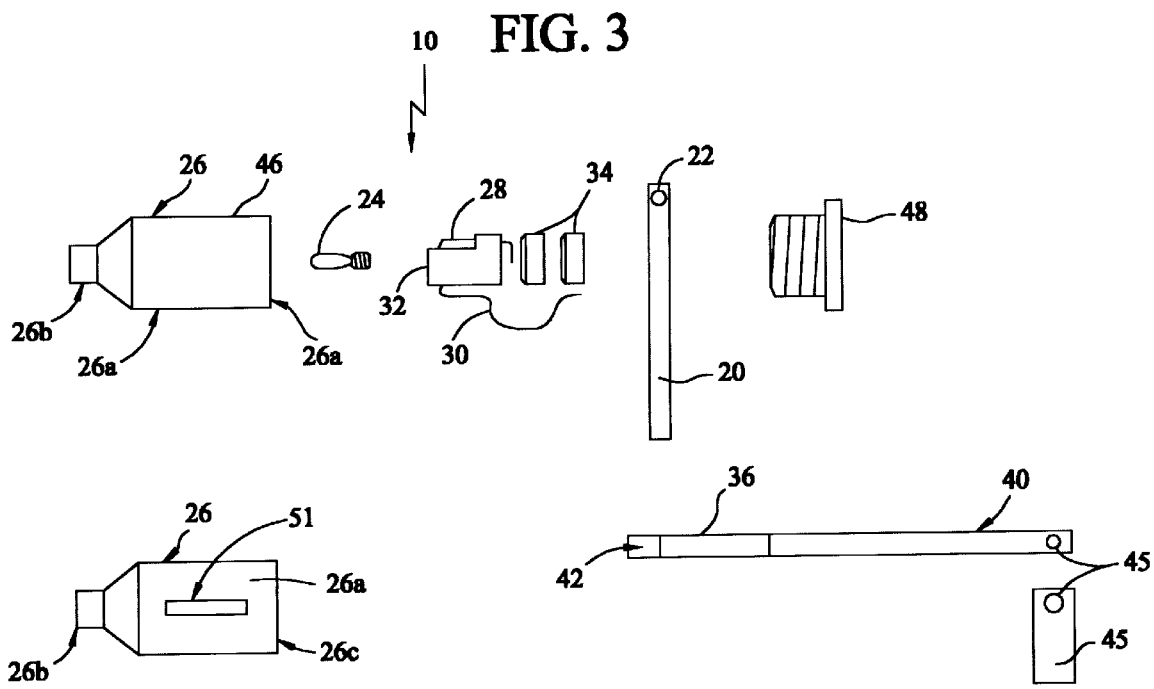
FIG. 3
FIG. 3A FIG. 4
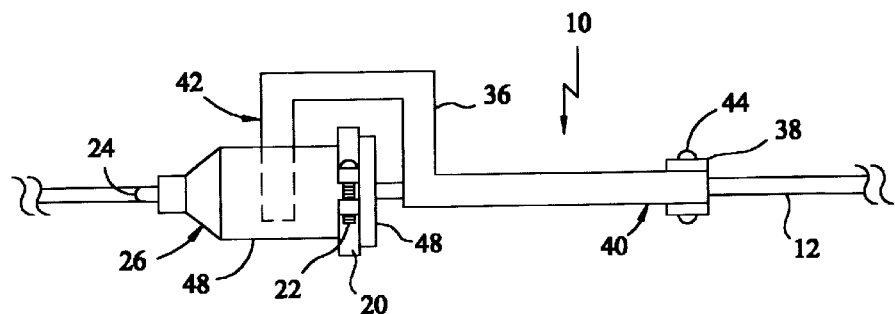
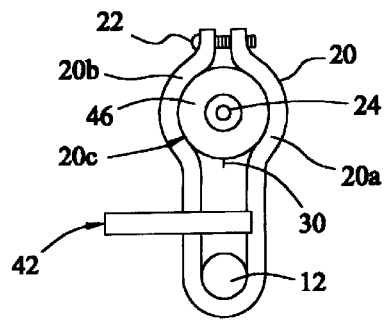
FIG. 5

FISH STRIKE DETECTOR FOR FISHING ROD

BACKGROUND OF THE INVENTION

1. Field of the Invention

The field of the present invention relates generally to strike detectors for use on fishing rods commonly utilized in fishing with rod and reel combinations. In particular, the present invention relates to fish strike detectors that utilize a rod clamping device to attach to a fishing rod. More specifically, the present invention relates to those fish strike detectors that clamp to a fishing rod and send a visual signal to the angler when a fish has made a strike on the bait attached to the fishing line.

2. Background

As is generally known in the sport and commercial fishing industries, anglers often hold onto their fishing rods while fishing so that they can feel when a fish strikes at the bait attached to the hook located at the end of the fishing line. Unfortunately, not all contact a fish makes with the bait is a strike. Often fish will merely "test" the bait to determine if it is of interest to the fish prior to taking it into its mouth. The intensity of the physical sensation the angler feels as a result of a fish contacting the bait lets the angler know if he or she should attempt to set the hook in the fish's mouth by flexing the rod away from the direction of the fish. After setting the hook, the angler can then reel the fish in.

In order to take advantage of the fish striking the bait, the angler must be ready to set the hook as soon as the fish makes a true strike, as opposed to merely "testing" the bait. This requires the angler to pay close attention to the movement of the fishing rod or line. One way to closely monitor fish contact with the bait is by holding on to the fishing rod so that the angler can feel when a fish makes a strike. Often, however, often the angler desires to leave the fishing rod unmanned or desires to have more than one fishing rod in the water at the same time. In these instances, the angler must typically rely on the visual movement of the fishing rod or line to let him or her know whether a fish is striking or merely testing the bait.

Relying on the visual movement of the fishing rod or line to let the angler know when a fish is striking at the bait can be difficult. If the angler has more than one line going, he or she may find it difficult to notice the small movement of the fishing rod or fishing line that can indicate a fish strike. If the angler is not positioned near the fishing rod or rods when a strike occurs, he or she can miss the movement from the strike altogether. At night or in other low light conditions, the problems with relying on the angler's visual perception is substantially compounded.

3. Related Art

A number of related art devices have attempted to overcome the problems with identifying when a fish strikes at the bait at the end of the fishing line coming from a fishing rod. These devices typically utilize mercury switches, mechanically operated switches or electronic circuit systems to determine when a fish is striking at the bait and to separate the strikes from mere testing of the bait. Although most of the related devices connect directly to the fishing rod, a few such devices connect to the reel. A majority of the related art devices are operatively connected to the fishing line so that the movement of the line will activate a signal to the angler when a fish is striking at the bait. Several devices monitor the movement of the fishing rod itself to determine when a fish is striking at the bait.

Many of the related art fish strike detectors utilize a relatively heavy enclosure that results in a weighty device at or near the end of the fishing rod, which can interfere with the angler's operation and monitoring of the fishing rod. The related art devices which utilize the movement of the fishing line tend to be overly sensitive to movement of the line or require relatively complex mechanical systems to determine when a fish strikes at the bait. The related art devices which utilize strain gages, mercury switches or electronic circuitry also tend to rely on unnecessarily complex systems to detect fish strikes. The complexity of these systems add to their weight and tend to make them overly sensitive to the physical nature of the use (i.e., casting the line, setting the hook, etc.) and transportation of fishing rods. The inability of the related art devices to withstand the inherent rigors of fishing use tends to make them unreliable as fish strike detectors.

SUMMARY OF THE INVENTION

The fish strike detector in accordance with the present invention solves the problems associated with the related art devices described above. That is to say, the present invention provides a fish strike detector that is relatively lightweight, simple to use, able to withstand the normal rigors of fishing operations and effective for detecting when a fish strikes the bait and notifying the angler of that strike.

The fish strike detector of the present invention can be constructed of strong, durable and corrosion resistant materials that are inexpensive and light weight, such as plastics and a variety of light weight metals (i.e., aluminum). The fish strike detector primarily comprises a rigid vertical member attached at one end to the fishing rod, a housing attached to the vertical member for housing the electrical components, and a contact member also attached at one end to the fishing rod. The vertical member of the fish strike detector can be placed near the end of the rod away from the angler (the forward end) and the contact member can be attached to the rod on the angler side of the vertical member (the rearward end). Alternatively, the relative positions of the vertical member and the contact member can be switched, to allow the angler to place the signal device in a position facing or away from him or her. The fish strike detector of the present invention is also suitable for placement above or below the fishing rod to function with those fishing systems that have the fishing line above or below the fishing rod.

The housing, removably attached to the vertical member, houses the electrical system components, including a source of electrical power, a light bulb and the electrical circuitry for operatively connecting the source of electrical power to the light bulb. A portion of the electrical circuitry extends outside the housing to form a flexible contact. Located on the vertical member is a conducting contact that is in electrical connection with the power source. The rigid contact member is attached at one end to the fishing rod such that when a fish strikes the bait and causes the rod to bend, the other end of the contact member engages the flexible contact. This action causes the flexible contact to connect with the conducting contact and complete the electrical circuit, thereby activating the light bulb and notifying the angler that he or she has a fish strike.

In use, a typical configuration has the vertical member attached to the fishing rod near the end of the rod away from the angler, where the flexing of the fishing rod is typically the greatest. The vertical member will either extend upwardly or downwardly from the rod, depending upon the angler's preference and location of the fishing line. The contact member is attached at one end to the fishing rod on either the angler side or the forward end side of the vertical member at a distance approximately equal to the length of the contact member from the portion of the electrical contact extending outside the housing. The power supply can consist of one or more small, lightweight batteries located inside the housing. The light bulb can extend beyond the end of the housing or the housing can be made of material that enables the angler to see the light from the bulb through the housing. If desired, different color light bulbs can be utilized to distinguish among various fishing rods when other anglers in the same area are using fish strike detectors or when the angler is fishing with more than one line.

Accordingly, the primary objective of the present invention is to provide a lightweight, durable and effective device for detecting when a fish strikes the bait at the end of the fishing line and for notifying the angler of that fish strike.

It is also an important objective of the present invention to provide a fish strike detector that is relatively inexpensive to make and simple to use.

Another important objective of the present invention is to provide a fish strike detector that signals the angler when the fishing rod is flexed due to a fish striking the bait at the end of the fishing line.

Yet another important objective of the present invention is to provide a fish strike detector that utilizes the flexing of the fishing rod to electrically connect a power supply to a signal device to notify the angler that a fish is striking at the bait at the end of the fishing line.

BRIEF DESCRIPTION OF THE DRAWINGS

In the drawings which illustrate the best modes presently contemplated for carrying out the present invention:

FIG. 3 is an exploded side view of the fish strike detector of the present invention;

FIG 3A is a bottom view of the housing of the present invention;

FIG. 4 is a top view of the fish strike detector of the present invention;

FIG. 5 is a front view of the fish strike detector of the present invention showing the clamping mechanism of the vertical member;

DETAILED DESCRIPTION OF THE PREFERRED EMBODIMENTS

Figure 1:
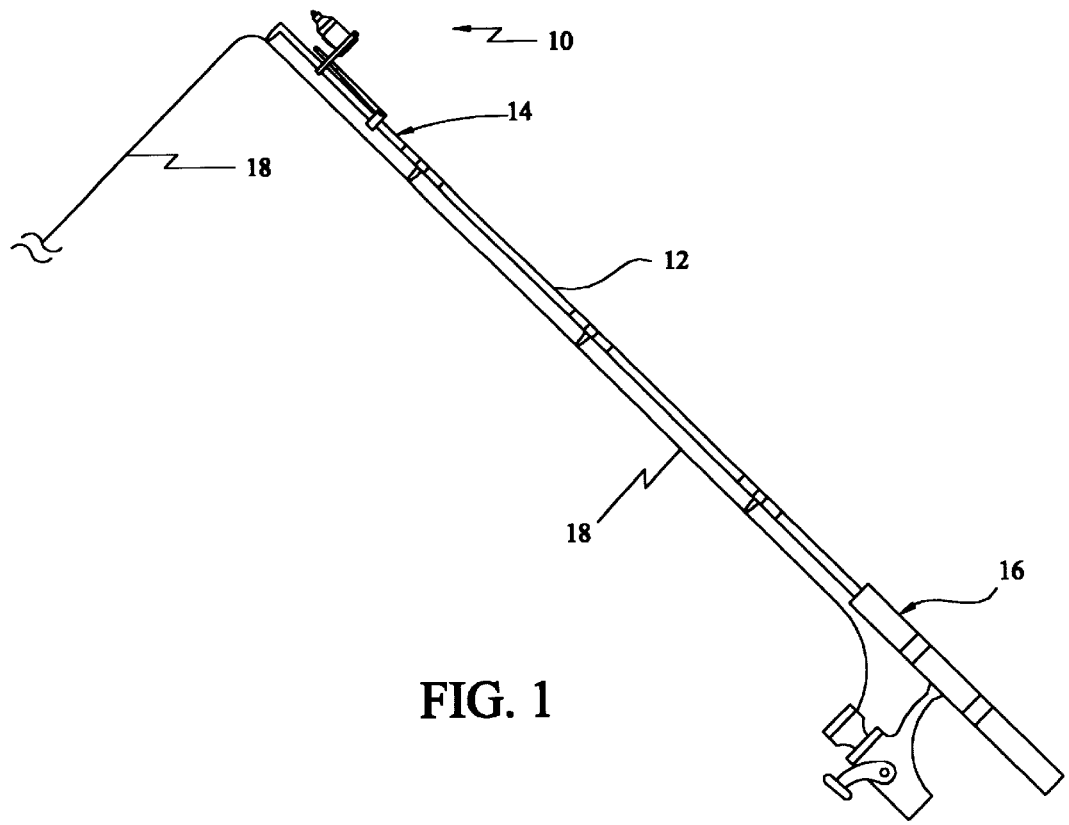
FIG. 1 is a perspective view of a fishing rod in combination with the fish strike detector of the present invention.
Figure 2:
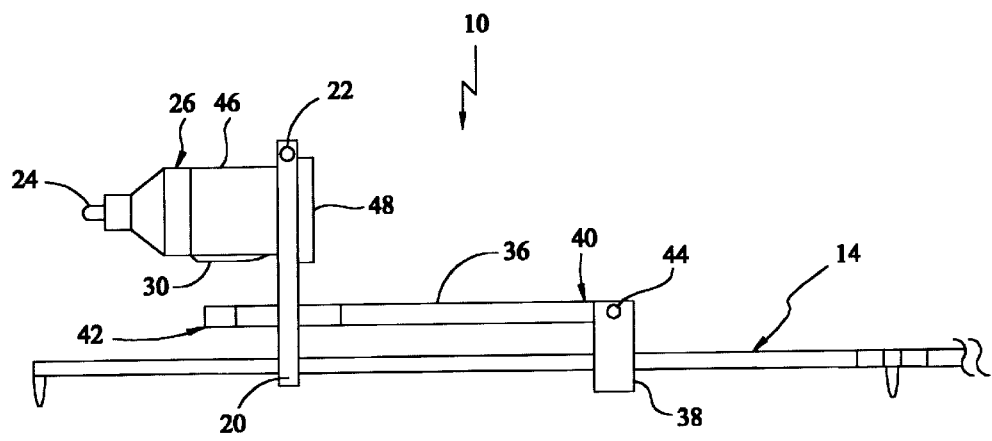
FIG. 2 is a fragmentary, enlarged side view of the outer end portion of the fishing rod of FIG. 1 showing the fish strike detector of the present invention.
Figure 6:
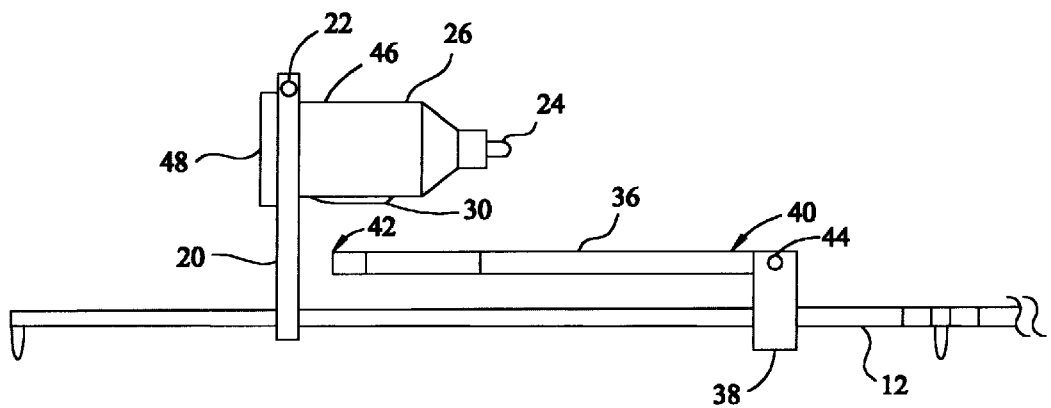
FIG. 6 is side view of an alternative arrangement of the fish strike detector of the present invention showing the visual indicator facing the handle end of the fishing rod.

With reference to the figures where like elements have been given like numerical designations to facilitate the reader's understanding of the present invention, and particularly with reference to the embodiment of the present invention illustrated in FIGS. 1 through 7, the preferred embodiment of the present invention is set forth below. The fish strike detector, designated generally as 10, is designed to be primarily used in conjunction with flexible fishing rod 12, as typically used in rod and reel fishing. One application of fish strike detector is 10, shown in FIGS. 1 and 2, is to attach it to the outer end 14 of fishing rod 12. Handle end 16 of fishing rod 12 is typically held by the angler or propped up against the ground, a rock or some other object while fishing. Fishing line 18 extends from rod 12 into the water where bait is attached to a fishing hook at the end of line 18. Although FIGS. 1 and 2 show fish strike detector 10 at outer end 14 of rod 12, it is understood that the invention is not so limited.

Vertical member 20, having a pair of upwardly extending arms 20a and 20b forming a grippable enclosure 20c (as best shown in FIG. 5), removably clamps to rod 12 by using a connecting device, such as bolt 22, best illustrated in FIG. 5. Other connecting mechanisms are also suitable for removably attaching vertical member 20 to rod 12, such as the bolt and wing combination 52 shown in FIG. 9 or an elastic band (not shown). Any such connecting mechanism must securely hold vertical member 20 to rod 12 in an essentially vertical position, such that vertical member 20 is generally perpendicular to the longitudinal axis of rod 12 when rod 12 is in a straight or non-flexed condition. To maintain the vertical condition, the vertical member 20 should be made of rigid material. Removably attached to or held by vertical member 20 is housing 26 (as best shown in FIG. 5). In the preferred embodiment, housing 26 is held in a generally parallel relationship to the longitudinal axis of rod 12 when rod 12 is in a straight or non-flexed condition.

Housing 26, having bottom surface 26a, front end 26b and opposing back end 26c (as best shown in FIGS. 3 and 3a), houses light bulb 24 and an electrical circuit having various components, such as first contact 28, second contact 30, connecting block 32 and power supply 34, coupled together in electrical connection with light bulb 24. As shown in FIG. 3, in the preferred embodiment the power supply 34 can consist of one or more small watch-type batteries. Light bulb 24 should removably connect with block 32 and can be of any color so that the angler can change the color of light bulb 24 as he or she desires. Alternatively, a light emitting diode can be used in place of light bulb 24 with the appropriate circuitry and power source for the selected diode.

Figure 8:
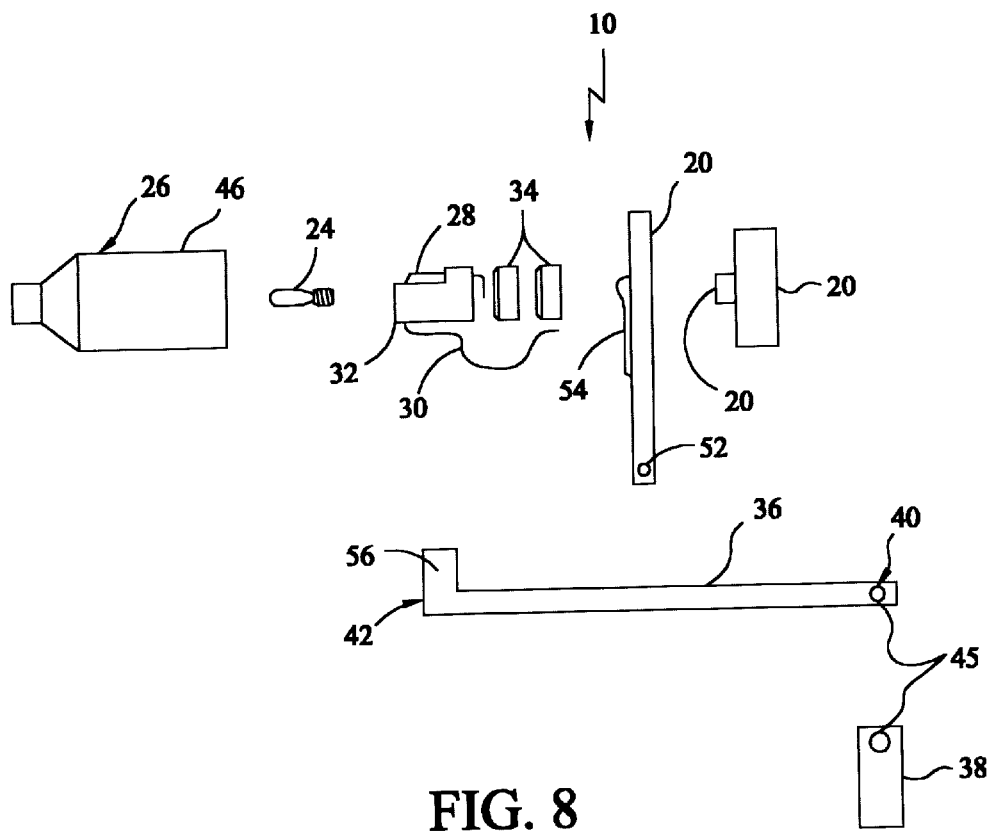
FIG. 8 is an exploded side view of an alternative embodiment of the present invention showing the use of an electrically conductive contact attached to the vertical member.
Figure 9:
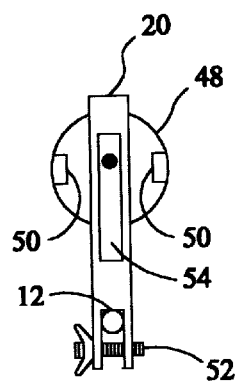
FIG. 9 is a front view of the vertical member of the present invention showing the electrically conducting contact located on the vertical member.

Housing 26 is sized to fit over the electrical circuit components described above and has two principal parts, main body 46 and housing end 48, which removably attaches to main body 46. As shown in FIG. 3, housing end 48 can be suitable for threadably connecting to body 46. Alternatively, as shown in FIGS. 8 and 9, housing end 48 can removably couple to main body 46 using connecting tabs 50. In the preferred embodiment, body 46 has an opening 51 in the bottom surface 26a of the body (as shown in FIG. 3A) to allow second contact 30 to extend outside body 46. The preferred embodiment has light bulb 24 extending past the open front end 26b of body 46 so that the angler can clearly see it when a fish strike activates the visual signal. Alternatively, the housing 26 or just the body 46 can be made of a transparent material to provide a housing that totally encloses light bulb 24 to protect it from damage. The body 46 can also include a Fresnel lens or similar configuration on its surface to further improve the ability of the angler to see the visual signal when a fish strikes the bait.

First contact 28 is electrically coupled to power supply 34. Second contact 30 should comprise an electrically conductive material that can be shaped into a flexed position, as shown in FIG. 3. Second contact 30 should be designed such that pressure applied to second contact 30 will cause it to extend into power supply 34 to complete the electrical circuit and energize light bulb 24.

To apply the required pressure to second contact 30 to extend it and activate the electrical circuit, the preferred embodiment utilizes a contact member 36. As shown in the various figures, contact member 36 has first end 40 removably attached to rod 12 by clamping member 38 having second attachment mechanism 44. Second end 42 of contact member 36 is designed to operatively connect with second contact 30. Second attachment mechanism 44 can comprise a bolt and nut combination to removably connect first end 40 to clamping member 38 at opening 45. In the embodiments shown in FIGS. 1 through 7, second attachment mechanism 44 connects first end 40 to the handle end 16 side of vertical member 20, although configurations having contact member 36 on outer end 14 side of vertical member 20 are also possible.

Figure 7:
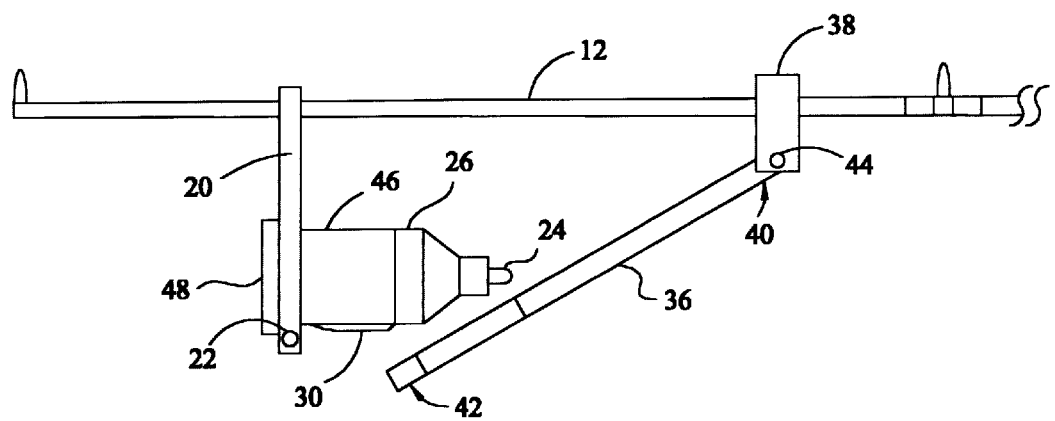
FIG. 7 is a side view of another arrangement of the present invention showing the fish strike detector located below the fishing rod.

Contact member 36 should be substantially rigid and designed to move freely of vertical member 20 and of sufficient length and rigidity that the flexing of rod 12 from a fish strike will cause second end 42 to apply sufficient pressure to second contact 30 to activate the electrical circuit and cause light bulb 24 to light. The relative angle of contact member 36 to the longitudinal axis of rod 12 can be adjusted to adapt to various fish strike detector 10 configurations, as shown in FIG. 7. Contact member 36 can be of adjustable length to allow the angler to adjust the sensitivity of the present invention to best work with the flexibility of his or her fishing rod.

In use, the angler attaches vertical member 20 of fish strike detector 10 to rod 12 using bolt 22 or other connecting mechanism. Clamping member 38 of the preferred embodiment connects to rod 12 such that second end 42 of contact member 36 is positioned below second contact 30 to operatively connect with second contact 30. When rod 12 is flexed due to a fish strike, housing 26 and second contact 30 move into contact with second end 42 of contact member 36, causing second contact 30 to lengthen and complete the circuit to activate light bulb 24. The angler would know that he or she had a fish striking and would pull back on rod 12 in an attempt to set the hook into the fish's mouth. When the angler needs to change the power supply 34 or light bulb 24, he or she can remove body 46 from housing end 48 and replace as necessary. The angler may want to change light bulb 24 to a different color to avoid conflict with other anglers or with other rods that the angler is watching.

An alternative embodiment of the present invention has contact member 36 on the outer end 14 side of rod 12. First end 40 would be closest to outer end 14 and second end 42 would be positioned below second contact 30. Contact member 36 would be located such that when rod 12 is flexed, housing 26 moves down such that second end 42 applies sufficient pressure to second contact 30 to activate light bulb 24.

Another embodiment of the present invention is illustrated in FIGS. 8 and 9. In this embodiment, first contact 28 is electrically coupled to power supply 34, which is in electrical connection with electrically conducting member 54 attached to vertical member 20. Conducting member 54 can comprise a strip of electrically conductive material, such as copper, having a knob-like projectile to facilitate its contact with power supply 34. As with the previous embodiments, second contact 30 comprises an electrically conductive material that is shaped into a flexed position. In this embodiment, second contact 30 is configured such that pressure applied to it will cause it to extend into conducting member 54 to complete the electrical circuit and energize light bulb 24. As shown in this embodiment, contact member 36 can comprise a vertical portion 56 either attached to or integral with contact member 36 at second end 42.

An alternative embodiment of the present invention utilizes an audio signal either in place of light bulb 24 or in conjunction with light bulb 24. The audio signal device should be sufficiently powered by power supply 34 that it can notify the angler who has left his or her rod near the water while he or she is doing something else. The audio signal device can comprise either a bell or a horn-type of signal of either singular or continuous duration. To avoid unwanted signals (i.e., when transporting the fishing rod 12), whether visual, audio or both, the fish strike detector 10 can include a switch for operatively connecting or disconnecting the power supply from the signal device. The switch can be attached to housing 26, vertical member 20 or contact member 36.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A fish strike detector for attachment to a flexible fishing rod used by an angler comprising:

a generally vertical member;

first attachment means on one end of said vertical member for removably attaching said vertical member to the flexible fishing rod in a generally perpendicular relationship to the longitudinal axis of the flexible fishing rod when the fishing rod is in a non-flexed condition;

indicator means for indicating to the angler when a fish is striking;

a housing having a bottom surface substantially parallel to the longitudinal axis of the fishing rod, a front end and an opposing back end for housing said indicator means at said front end of said housing, said housing having an opening in said bottom surface, said housing adapted to additionally house a power supply and an electrical circuit, said electrical circuit having components including a first contact and a second contact, said first contact electrically coupled to said power supply, said second contact being flexible and configured to extend outside of said housing through said opening in said bottom surface and operatively contact said power supply, said housing further adapted to be removably mounted on said vertical member;

circuit activation means for engaging said second contact, said circuit activation means comprising a contact member configured to operatively engage said second contact; and second attachment means for removably attaching said circuit activation means to the flexible fishing rod, whereby when said various means and members are assembled on the flexible fishing rod and the outer end of the flexible fishing rod is flexed due to a fish strike, said circuit activation means engages said second contact causing said second contact to extend and electrically connect with said power supply so as to complete the electrical circuit and activate said indicator means, causing said indicator means to indicate to the angler that a fish strike is occurring.

2. The fish strike detector according to claim 1, wherein said first attachment means is a clamp.

3. The fish strike detector according to claim 1, wherein said vertical member is substantially rigid.

4. The fish strike detector according to claim 1, wherein said first attachment means attaches said vertical member in a generally perpendicular relationship to the longitudinal axis of the flexible fishing rod when the fishing rod is in a non-flexed condition.

5. The fish strike detector according to claim 1, wherein said indicator means is only partially enclosed in said housing.

6. The fish strike detector according to claim 1, wherein said indicator means is fully enclosed in said housing and said housing is transparent.

7. The fish strike detector according to claim 1, wherein said indicator means is capable of emitting a visual signal.

8. The fish strike detector according to claim 7, wherein said indicator means is a light bulb.

9. The fish strike detector according to claim 1, wherein said indicator means is capable of emitting an audible signal.

10. The fish strike detector according to claim 1, wherein said indicator means is capable of emitting both audible and visual signals.

11. The fish strike detector according to claim 1, wherein said housing is removably mounted on said vertical member in a generally parallel relationship to the longitudinal axis of the flexible fishing rod when the fishing rod is in a non-flexed condition.

12. The fish strike detector according to claim 1, wherein said circuit activation means comprises a substantially rigid contact member having a first end and a second end, said first end removably attached to said second attachment means, said second end adapted to engage said second contact.

13. The fish strike detector according to claim 1 further comprising electrically conducting member for conducting electrical current between said power supply and said second contact, said electrically conducting member located on the outer surface of said vertical member in electrical connection with said power supply, said second contact being adapted to contact said electrically conducting member when said circuit activation means applies pressure to said second contact.

14. A fish strike detector for attachment to a flexible fishing rod used by an angler comprising:

a substantially rigid vertical member, said vertical member having a pair of upwardly extending arms forming a grippable enclosure;

first attachment means on one end of said vertical member for removably attaching said vertical member to the flexible fishing rod in a generally perpendicular relationship to the longitudinal axis of the flexible fishing rod when the fishing rod is in a non-flexed condition;

indicator means for indicating to the angler when a fish is striking;

a housing having a bottom surface substantially parallel to the longitudinal axis of the fishing rod, a front end and an opposing back end for housing said indicator means at said front end of said housing, said housing having an opening in said bottom surface, said housing adapted to additionally house a power supply and an electrical circuit, said electrical circuit having components including a first contact and a second contact, said first contact electrically coupled to said power supply, said second contact being flexible and configured to extend outside of said housing through said opening in said bottom surface and operatively contact said power supply, said housing further adapted to be removably mounted said back end of said housing further adapted to be removably mounted in said grippable enclosure on said vertical member in a generally parallel relationship to the longitudinal axis of the flexible fishing rod when the fishing rod is in a non-flexed condition;

means for clamping said grippable enclosure around said housing to hold said housing on said vertical member;

a substantially rigid contact member, said contact member having a first end and a second end, said second end adapted to operatively engage said second contact to extend said second contact into electrical connection with said power supply; and second attachment means for removably attaching said first end of said contact member to the flexible fishing rod.

15. The fish strike detector according to claim 14, wherein said first attachment means is a clamp and said second attachment means is a clamp.

16. The fish strike detector according to claim 14 further comprising electrically conducting member for conducting electrical current between said power supply and said second contact, said electrically conducting member located on the outer surface of said vertical member in electrical connection with said power supply, said second contact being adapted to contact said electrically conducting member when said contact member applies pressure to said second contact.

17. The fish strike detector according to claim 14, wherein said first attachment means attaches said vertical member to the flexible fishing rod in a position generally forward of where said first end of said contact member attaches to the flexible fishing rod.

18. The fish strike detector according to claim 14, wherein said indicator means is a light bulb.

19. A fish strike detector for attachment to a flexible fishing rod used by an angler comprising:

a substantially rigid vertical member removably clamped to the flexible fishing rod in a generally perpendicular relationship to the longitudinal axis of the flexible fishing rod when the fishing rod is in a non-flexed condition, said vertical member having a pair of upwardly extending arms forming a grippable enclosure;

a light bulb;

a housing having a bottom surface substantially parallel to the longitudinal axis of the fishing rod, a front end and an opposing back end for housing said light bulb at said front end of said housing, said light bulb extending outside of said housing, said housing having an opening in said bottom surface, said housing adapted to additionally house a power supply and an electrical circuit, said electrical circuit having components including a first contact and a second contact, said first contact electrically coupled to said power supply, said second contact being flexible and configured to extend outside of said housing through said opening in said bottom surface and operatively contact said power supply, said back end of said housing further adapted to be removably mounted in said grippable enclosure on said vertical member in a generally parallel relationship to the longitudinal axis of the flexible fishing rod when the fishing rod is in a non-flexed condition;

means for clamping said grippable enclosure around said housing to hold said housing on said vertical member and said vertical member to the flexible fishing rod; and a substantially rigid contact member, said contact member having a first end and a second end, said second end being adapted to operatively engage said second contact, said first end removably attached to the flexible fishing rod.

20. The fish strike detector according to claim 19 further comprising electrically conducting member for conducting electrical current between said power supply and said second contact, said electrically conducting member located on the outer surface of said vertical member in electrical connection with said power supply, said second contact being adapted to contact said electrically conducting member when said contact member applies pressure to said second contact.

* * * * *